(12) United States Patent
Suemitsu et al.

(10) Patent No.: US 9,884,721 B2
(45) Date of Patent: Feb. 6, 2018

(54) SHIPPING ORDER ALLOCATION APPARATUS

(71) Applicant: HITACHI TRANSPORT SYSTEM, LTD., Tokyo (JP)

(72) Inventors: Issei Suemitsu, Tokyo (JP); Satoshi Nagahara, Tokyo (JP)

(73) Assignee: HITACHI TRANSPORT SYSTEM, LTD., Tokyo (JP)

( * ) Notice: Subject to any disclaimer, the term of this patent is extended or adjusted under 35 U.S.C. 154(b) by 0 days.

(21) Appl. No.: 15/544,340

(22) PCT Filed: Jan. 23, 2015

(86) PCT No.: PCT/JP2015/051818
§ 371 (c)(1),
(2) Date: Jul. 18, 2017

(87) PCT Pub. No.: WO2016/117111
PCT Pub. Date: Jul. 28, 2016

(65) Prior Publication Data
US 2017/0369245 A1 Dec. 28, 2017

(51) Int. Cl.
*G06F 7/00* (2006.01)
*B65G 1/137* (2006.01)
*G06Q 50/28* (2012.01)

(52) U.S. Cl.
CPC ........... *B65G 1/1373* (2013.01); *G06Q 50/28* (2013.01)

(58) Field of Classification Search
None
See application file for complete search history.

(56) References Cited

U.S. PATENT DOCUMENTS

2015/0227890 A1* 8/2015 Bednarek ......... G06Q 10/08355
705/26.81

FOREIGN PATENT DOCUMENTS

JP 2009-298522 A 12/2009
JP 2011-037568 A 2/2011

OTHER PUBLICATIONS

International Search Report, dated Apr. 14, 2015, which issued during the prosecution of International Application No. PCT/JP2015/051818, which corresponds to the present application.

* cited by examiner

*Primary Examiner* — Yolanda R Cumbess
(74) *Attorney, Agent, or Firm* — Baker Botts, L.L.P.

(57) ABSTRACT

A shipping order allocation apparatus creates a group composed of shipping orders; acquires a time to start picking for the group; acquires blocks where articles included in the group are stored and calculates a total worktime for the picking of the group; determines whether the picking work for the group is completed by the earliest shipping time limit among shipping time limits of the shipping orders in the group, the time to start the picking, and the total worktime for the picking; calculates an evaluation value of the group for which the picking work is determined to be completed by the earliest shipping time limit, based on the blocks storing the articles included in the group; and determines whether to include the group in a result of allocation to groups, based on the evaluation value.

6 Claims, 11 Drawing Sheets

| SHIPPING ORDER ID | ARTICLE ID | SHIPPING QUANTITY |
|---|---|---|
| Order0000001 | Product001 | 3 |
| Order0000001 | Product008 | 8 |
| Order0000001 | Product019 | 2 |
| : | : | : |
| Order0000002 | Product032 | 1 |
| : | : | : |
| Order0000100 | Product013 | 2 |
| : | : | : |

*FIG. 4*

| ARTICLE ID | BLOCK ID |
|---|---|
| Product001 | Shelf001 |
| Product002 | Shelf002 |
| : | : |
| Product032 | Shelf001 |
| : | : |

*FIG. 5*

| START POINT BLOCK ID | END POINT BLOCK ID | DISTANCE |
|---|---|---|
| Shelf001 | Shelf002 | 19 |
| Shelf001 | Shelf003 | 35 |
| : | : | : |
| Shelf002 | Shelf001 | 22 |
| : | : | : |

*FIG. 6*

| SHIPPING ORDER ID | SHIPPING TIME LIMIT |
|---|---|
| Order0000001 | 16:00 |
| Order0000002 | 18:00 |
| : | : |
| Order0000010 | 17:00 |
| : | : |

*FIG. 7*

| SHIPPING ORDER ID | SHIPPING ORDER GROUP ID |
|---|---|
| Order0000001 | Group005 |
| Order0000002 | Group005 |
| Order0000003 | Group001 |
| Order0000004 | Group009 |
| Order0000005 | Group003 |
| : | : |

FIG. 8

| SHIPPING ORDER GROUP ID | WORKTIME |
|---|---|
| Group001 | 2500 |
| Group002 | 1400 |
| Group003 | 1000 |
| : | : |

FIG. 9

| ITEM | VALUE |
|---|---|
| MAXIMUM ORDERS TO BE ALLOCATED TO SHIPPING ORDER GROUP | 6 |
| TRAVELING SPEED (m/sec) | 0.2 |
| PICKING TIME PER PIECE (sec/piece) | 10 |
| ⋮ | ⋮ |

*FIG. 10*

| SHIPPING ORDER GROUP ID | START BLOCK ID | END BLOCK ID | ARTICLE ID | PICKING QUANTITY | TRAVEL DISTANCE | REQUIRED TIME |
|---|---|---|---|---|---|---|
| Group1 | Start | Shelf1 | Product1 | 3 | 8 | 106 |
| Group1 | Shelf1 | Shelf5 | Product8 | 8 | 5 | 132 |
| ⋮ | ⋮ | ⋮ | ⋮ | ⋮ | ⋮ | ⋮ |
| Group1 | Shelf12 | End | - | - | 10 | 50 |
| Group2 | Start | Shelf6 | Product9 | 1 | 4 | 31 |
| ⋮ | ⋮ | ⋮ | ⋮ | ⋮ | ⋮ | ⋮ |
| Group2 | Shelf21 | End | - | - | 5 | 20 |
| ⋮ | ⋮ | ⋮ | ⋮ | ⋮ | ⋮ | ⋮ |

*FIG. 11*

RESULT OF ORDER ALLOCATION

■LIST OF ORDERS AND SHIPPING ORDER GROUPS  1401

| ORDER NO. | SHIPPING ORDER GROUP NO. |
|---|---|
| ORDER 1 | GROUP 1 |
| ORDER 2 | GROUP 3 |
| ORDER 3 | GROUP 1 |
| ORDER 4 | GROUP 2 |
| ⋮ | ⋮ |

■DETAILED SHIPPING ORDER GROUP INFORMATION  1402

| SHIPPING ORDER GROUP NO. | WORKTIME |
|---|---|
| GROUP 1 | 1000 SEC |
| GROUP 2 | 400 SEC |
| GROUP 3 | 500 SEC |
| GROUP 4 | 200 SEC |
| ⋮ | ⋮ |

[APPLY] [RECALCULATE]

*FIG. 16*

SHIPPING ORDER ALLOCATION APPARATUS

BACKGROUND OF THE INVENTION

The present invention relates to a shipping order allocation apparatus.

Warehouse work for sending out intended articles from a warehouse is represented by picking work. The picking work is a series of work where a worker leaves a picking start point, moves around the storage shelves in the warehouse to collect articles designated by a shipping order, and arrives at a picking end point. Multi-order picking is one of the ways of such picking work, where a worker collects articles included in multiple shipping orders together. In this description, a set of shipping orders for which the articles should be collected together is referred to as shipping order group.

When the multi-order picking is employed, each worker is assigned one shipping order group; the worker moves around and visits the storage shelves storing the articles included in the shipping order group to collect the articles. To efficiently complete the picking work of this style, it is important to optimize the allocation of shipping orders, that is, which shipping order is to be allocated to which shipping order group (set of shipping orders). Hereinafter, the determination of shipping order allocation as described above is referred to as order allocation.

An example of an existing order allocation method is disclosed in JP 2011-37568 A.

SUMMARY OF THE INVENTION

The shipping order allocation method of JP 2011-37568 A aims to achieve efficiency in picking work by focusing on the travel distance in the picking. However, the method of JP 2011-37568 A does not take account of the time limits to ship the individual shipping orders; accordingly, the shipping orders may miss the shipping time limits. An object of this invention is to achieve a shorter total worktime for the shipping work, while adhering to the shipping schedule.

The aspect of the present invention adopts the following configuration for solving the above problems. A shipping order allocation apparatus comprising a processor and a storage device and configured to allocate shipping orders to shipping order groups, the shipping order allocation apparatus, wherein the storage device holds: shipping order information indicating shipping orders and articles included in the shipping orders; shipping time-limit information indicating shipping time limits of the shipping orders; and article location information indicating blocks where articles included in the shipping orders are stored, and wherein the processor is configured to: create a shipping order group composed of shipping orders included in the shipping order information; acquire a time to start picking for the shipping order group; acquire blocks where articles included in the shipping order group are stored from the article location information and calculate a total worktime for the picking of the shipping order group based on the acquired blocks; determine whether the picking work for the shipping order group is completed by the earliest shipping time limit among shipping time limits of the shipping orders in the shipping order group based on the shipping time-limit information, the time to start the picking, and the total worktime for the picking; calculate an evaluation value of the shipping order group for which the picking work is determined to be completed by the earliest shipping time limit among the shipping time limits of the shipping orders in the shipping order group, based on the blocks storing the articles included in the shipping order group; and determine whether to include the shipping order group in a result of allocation to shipping order groups, based on the evaluation value.

This invention achieves a shorter total worktime for shipping work, while adhering to the shipping schedule.

BRIEF DESCRIPTION OF THE DRAWINGS

The present invention can be appreciated by the description which follows in conjunction with the following figures, wherein:

FIG. 4 shows an example of a shipping order information table;

FIG. 5 shows an example of an article location information table;

FIG. 6 shows an example of a block-to-block distance information table;

FIG. 7 shows an example of a shipping time-limit information table;

FIG. 8 shows an example of a shipping order allocation result information table;

FIG. 9 shows an example of a shipping order group worktime information table;

FIG. 10 shows an example of a parameter information table;

FIG. 11 shows an example of a shipping history information table;

FIG. 16 shows an example of a screen to output a result of order allocation.

DETAILED DESCRIPTION OF THE EMBODIMENTS

Hereinafter, embodiments of this invention will be described with reference to the accompanying drawings. It should be noted that the embodiments are merely examples to implement this invention and are not to limit the technical scope of this invention. Throughout the drawings, common elements are denoted by the same reference signs.

Figure 1:
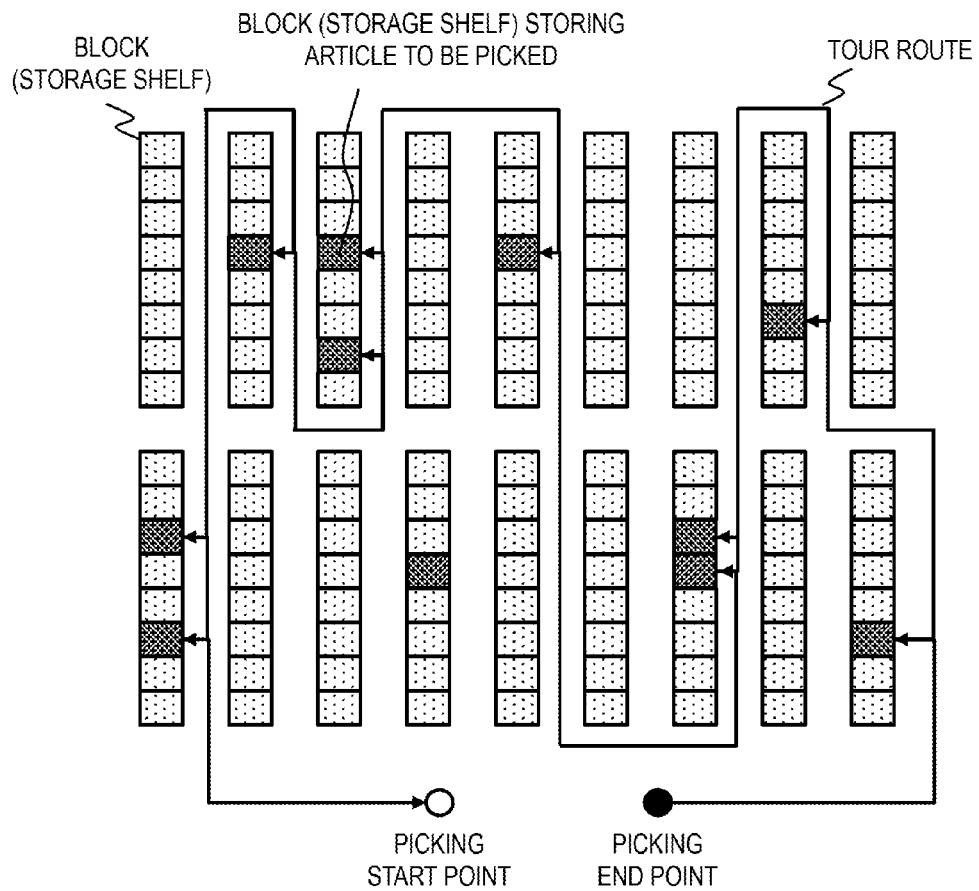
FIG. 1 is a diagram illustrating an example of an overview of a picking area.

FIG. 1 illustrates an example of an overview of a picking area. In the picking area, the storage area for the articles is divided into a plurality of blocks each corresponding to a storage shelf. The picker leaves a picking start point, moves around the picking area along the shortest route to collect articles included in shipping orders, and moves to a picking end point after completion of collecting all articles included in the shipping orders. The shipping order allocation apparatus provides the user with a shipping order allocation plan that achieves both a shorter picking worktime and adherence to the shipping schedule. Hereinafter, the shipping order may be simply referred to as order.

Figure 2:
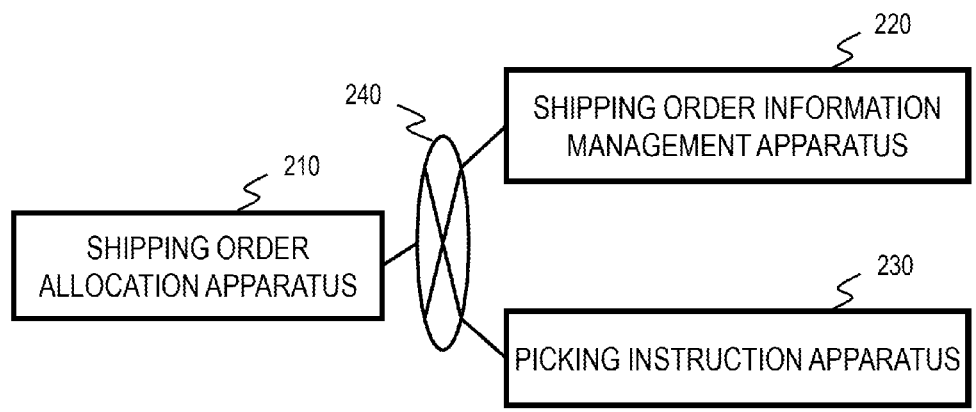
FIG. 2 is a schematic diagram illustrating an example of a shipping order allocation system.

FIG. 2 illustrates an example of a shipping order allocation system. The shipping order allocation system in this embodiment includes a shipping order allocation apparatus 210, a shipping order information management apparatus 220, and a picking work instruction apparatus 230. The apparatuses included in the shipping order allocation system are capable of communicating information with one another via a network 240.

The shipping order information management apparatus 220 receives input from an information terminal used in picking work and manages information on shipping orders. The shipping order information management apparatus 220 sends information on shipping orders to the shipping order allocation apparatus 210 at a predetermined time or in response to a request from the shipping order allocation apparatus 210. The shipping order allocation apparatus 210 stores the information to a shipping order information storage area 111.

The picking work instruction apparatus 230 manages information on instructions to allocate picking work of articles to shipping order groups. The picking work instruction apparatus 230 receives information in the shipping order information storage area 111 from the shipping order allocation apparatus 210 at a predetermined time or in response to a request from the shipping order allocation apparatus 210.

Figure 3:
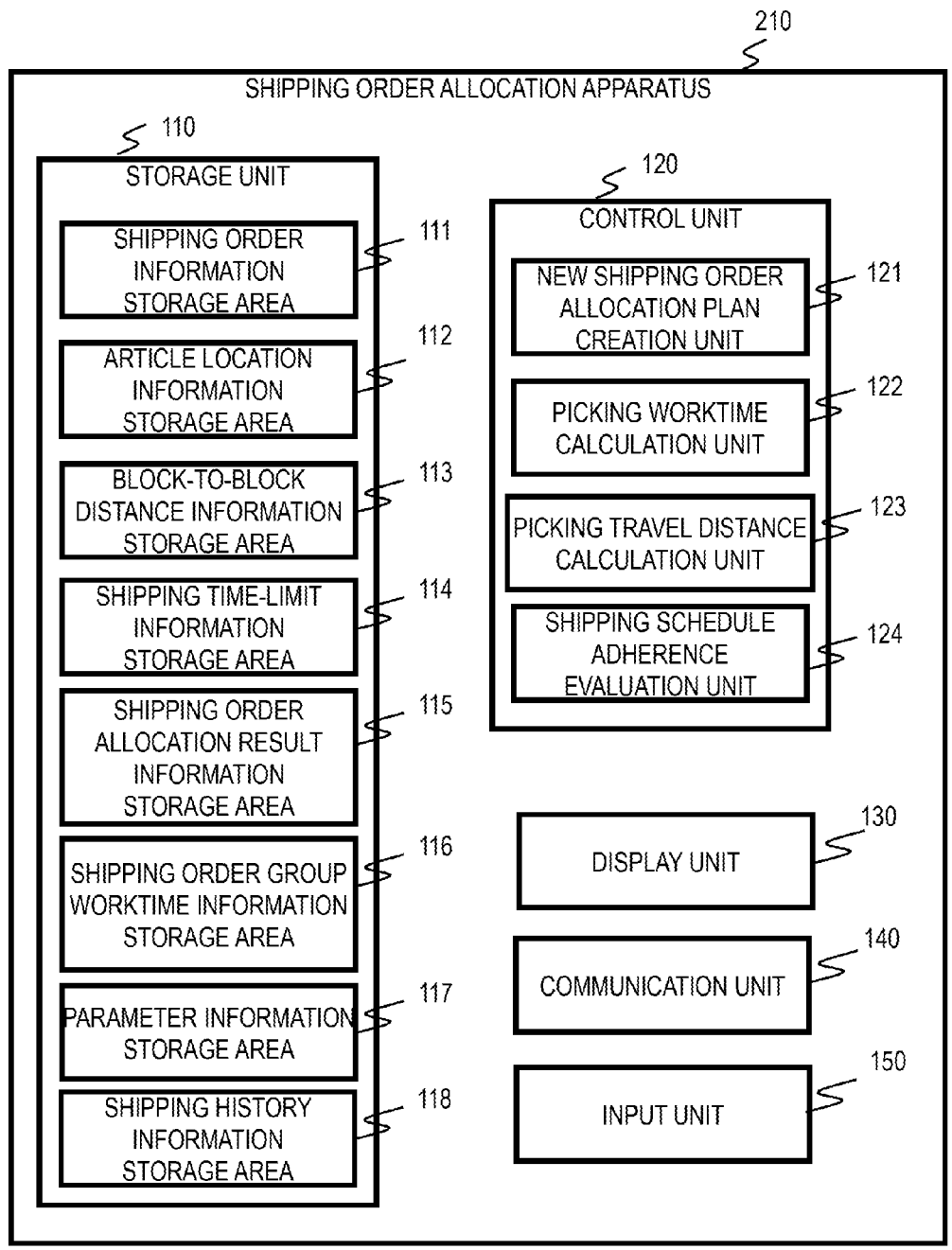
FIG. 3 is a block diagram for illustrating a configuration example of the shipping order allocation apparatus.

FIG. 3 is a block diagram for illustrating a configuration example of the shipping order allocation apparatus. The shipping order allocation apparatus 210 in this embodiment includes a storage unit 110, a control unit 120, a display unit 130, a communication unit 140, and an input unit 150. These are configured on a general-use computer. Specifically, the storage unit 110 corresponds to a storage device, the control unit 120 corresponds to a processor, the display unit 130 corresponds to a monitor, the communication unit 140 corresponds to a LAN connection device, and the input unit 150 corresponds to a keyboard and/or a mouse, for example. Strictly speaking, the processing of the control unit 120 is implemented by cooperation of the processor and a program; however, this specification uses the description that the processor performs the processing.

<Information Stored in Storage Unit 110>

The storage unit 110 includes a shipping order information storage area 111, an article location information storage area 112, a block-to-block distance information storage area 113, a shipping time-limit information storage area 114, a shipping order allocation result information storage area 115, a shipping order group worktime information storage area 116, a parameter information storage area 117, and shipping history information storage area 118.

The shipping order information storage area 111 stores information for identifying the articles and the shipping quantities thereof included in each shipping order. FIG. 4 shows a shipping order information table 1110 stored in the shipping order information storage area 111 in this embodiment. The shipping order information table 1110 in this embodiment includes columns of shipping order IDs 111a, article IDs 111b, and shipping quantities 111c. Each shipping order ID 111a stores information for identifying a shipping order. Each article ID 111b stores information (such as an article name, model number, or inventory code) for teaching an article included in the shipping order in the shipping order ID 111a. Each shipping quantity 111c stores information for teaching the shipping quantity of the article in the article ID 111b.

In this embodiment, FIG. 4 has three rows including a value "Order0000001" in the shipping order ID 111a; these three rows include values "Product001", "Product008", and "Product019" in the article IDs 111b and values "3", "8", and "2" in the shipping quantities 111c. This information teaches that the shipping order having an ID "Order0000001" includes at least three kinds of articles, their article IDs are "Product001", "Product008", and "Product019", and their respective shipping quantities are "3", "8", and "2".

The article location information storage area 112 stores information for teaching the blocks storing articles. FIG. 5 shows an article location information table 1120 stored in the article location information storage area 112 in this embodiment. The article location information table 1120 in this embodiment includes columns of article IDs 112a and block IDs 112b. Each article ID 112a stores information for identifying an article. Each block ID 112b stores information for teaching the block where the article in the article ID 112a is stored. In this embodiment, the first row of the column of article IDs 112a in FIG. 5R stores a value "Product001" and the first row of the column of block IDs 112b stores a value "Shelf001". This information teaches that the article having an article ID "Product001" is stored in the block having a block ID "Shelf001".

The block-to-block distance information storage area 113 stores information for teaching the distances between blocks. FIG. 6 shows a block-to-block distance information table 1130 stored in the block-to-block distance information storage area 113 in this embodiment. The block-to-block distance information table 1130 includes columns of start block IDs 113a, end block IDs 113b, and distances 113c. Each start block ID 113a stores information for identifying a start block. The start blocks include the picking start point in addition to the article storage blocks such as storage shelves. Each end block ID 113b stores information for identifying an end block. The end blocks include the picking end point in addition to the article storage blocks such as storage shelves. Each distance 113c stores information for teaching the distance from the start block in the start block ID 113a to the end block in the end block ID 113b.

In this embodiment, to record the travel distance between the block of the block ID "Shelf001" and the block of the block ID "Shelf002", two entries are stored as shown in FIG. 6 where the start block is the shelf ID "Shelf001" and the start block is the shelf ID "Shelf002". The reason why the route is specified is that the travel distances can be different depending on which block is to be the start point, because the traveling directions on the pathways in the picking area are specified. Unless otherwise specified, the table 1130 may include only information for identifying each interval (two blocks) and the distance therebetween. As will be described later, the distances stored in the column of distances 113c are used to calculate a picking worktime; accordingly, the distances 113c are preferably the distances along the pathways on which the worker travels. However, the direct distances can be recorded because the direct distances and the travel distances along the pathways have a consistent relationship.

The shipping time-limit information storage area 114 stores information for teaching time limits to ship individual shipping orders. FIG. 7 shows a shipping time-limit information table 1140 stored in the shipping time-limit information storage area 114 in this embodiment. The shipping time-limit information table 1140 in this embodiment includes columns of shipping order IDs 114a and shipping time limits 114b. Each shipping order ID 114a stores information for identifying a shipping order. Each shipping time limit 114*b* stores information for teaching the time limit to ship the shipping order. For example, the table 1140 teaches that the time limit to ship the shipping order of the ID "Order0000001" is "16:00". The column of shipping time limits 114*b* can store information indicating only the shipping due dates. In this case, a specified time (for example, 23 hours, 59 minutes, and 59 seconds) on the shipping due date can be defined as shipping time limit.

The shipping order allocation result information storage area 115 stores information for teaching a result of the later-described processing of the new shipping order allocation plan creation unit 121, or the shipping order groups allocated shipping orders. FIG. 8 shows a shipping order allocation result information table 1150 stored in the shipping order allocation result information storage area 115 in this embodiment. The shipping order allocation result information table 1150 in this embodiment includes columns of shipping order IDs 115*a* and shipping order group IDs 115*b*. Each shipping order ID 115*a* stores information for identifying a shipping order. Each shipping order group ID 115*b* stores information for teaching a shipping order group ID allocated the shipping order in the shipping order ID 115*a* in the shipping order allocation. For example, the table 1150 teaches that the shipping order of the shipping order ID "Order0000001" is allocated to the shipping order group of the shipping order group ID "Group005".

The shipping order group worktime information storage area 116 stores information for teaching shipping order groups and worktimes for the shipping order groups. FIG. 9 shows a shipping order group worktime information table 1160 stored in the shipping order group worktime information storage area 116 in this embodiment. The shipping order group worktime information table 1160 includes columns of shipping order group IDs 116*a* and worktimes 116*b*. Each shipping order group ID 116*a* stores information for identifying a shipping order group. Each worktime 116*b* stores information for teaching the total worktime for the shipping order group. For example, the table 1160 teaches that the total worktime for picking the shipping orders under the shipping order group ID "Group001" is "2500".

The parameter information storage area 117 stores constraint conditions (items and values thereof) to create a shipping order group and information for teaching items and values thereof required to calculate the total worktime for a shipping order group.

FIG. 10 shows a parameter information table 1170 stored in the parameter information storage area 117 in this embodiment. The parameter information table 1170 in this embodiment includes columns of items 117*a* and values 117*b*. Each item 117*a* stores information for identifying a parameter item. Each value 117*b* stores information for teaching the value of the parameter item in the item 117*a*.

The shipping history information storage area 118 stores information for teaching specifics of the article picking work for the shipping order groups in the past. FIG. 11 shows a shipping history information table 1180 stored in the shipping history information storage area 118 in this embodiment. The shipping history information table 1180 in this embodiment includes columns of shipping order group IDs 118*a*, start block IDs 118*b*, end block IDs 118*c*, article IDs 118*d*, picking quantities 118*e*, travel distances 118*f*, and required times 118*g*.

Each shipping order group ID 118*a* stores information for identifying a shipping order group. Each start block ID 118*b* and end block ID 118*c* store information for teaching the start block and the end block, respectively. Each article IDs 118*d* stores information for teaching an article picked from the end block in the end block ID 118*c*. Each picking quantity 118*e* stores information for teaching the picking quantity of the article in the article ID 118*d*. Each travel distance 118*f* stores information for teaching the travel distance from the start block in the start block ID 118*b* to the end block in the end block ID 118*c*. Each required time 118*g* stores information for teaching the time required to move from the start block in the start block ID 118*b* to the end block in the end block ID 118*c* and complete picking the article in the article ID 118*d*.

It should be noted that the storage unit 110 does not need to include the shipping history information storage area 118, if the picking worktime calculation unit 122 does not use the information stored in the shipping history information storage area 118 at later-described Step S800 in FIG. 12 and Step S1600 in FIG. 13.

<Processing Flow of Control Unit 120>

As shown in FIG. 3, the control unit 120 includes a new shipping order allocation plan creation unit 121, a picking worktime calculation unit 122, a picking travel distance calculation unit 123, and a shipping schedule adherence evaluation unit 124.

The new shipping order allocation plan creation unit 121 creates a new shipping order allocation plan, using information held in the shipping order information storage area 111, the article location information storage area 112, the block-to-block distance information storage area 113, and the shipping time-limit information storage area 114. Furthermore, the new shipping order allocation plan creation unit 121 stores created information on the result of shipping order allocation to the shipping order allocation result information storage area 115.

The picking worktime calculation unit 122 calculates the total worktime for the picking in accordance with the new shipping order allocation plan created by the new shipping order allocation plan creation unit 121, using information held in the shipping order information storage area 111, the article location information storage area 112, and the block-to-block distance information storage area 113.

The picking travel distance calculation unit 123 calculates the total travel distance for the picking in accordance with the new shipping order allocation plan created by the new shipping order allocation plan creation unit 121, using information held in the shipping order information storage area 111, the article location information storage area 112, and the block-to-block distance information storage area 113.

The shipping schedule adherence evaluation unit 124 determines whether each shipping order allocation plan can adhere to its shipping schedule, using information held in the shipping order information storage area 111, the shipping order group worktime information storage area 116, and the shipping time-limit information storage area 114.

The processing of the new shipping order allocation plan creation unit 121, the picking worktime calculation unit 122, the picking travel distance calculation unit 123, and the shipping schedule adherence evaluation unit 124 is further described later in detail.

The display unit 130 outputs information in the storage unit 110. The display unit 130 displays information in the shipping order allocation result information storage area 115, information in the shipping order group worktime information storage area 116, and other information. The communication unit 140 communicates information with external apparatuses via the network. The input unit 150 may receive input from the user.

Figure 12:
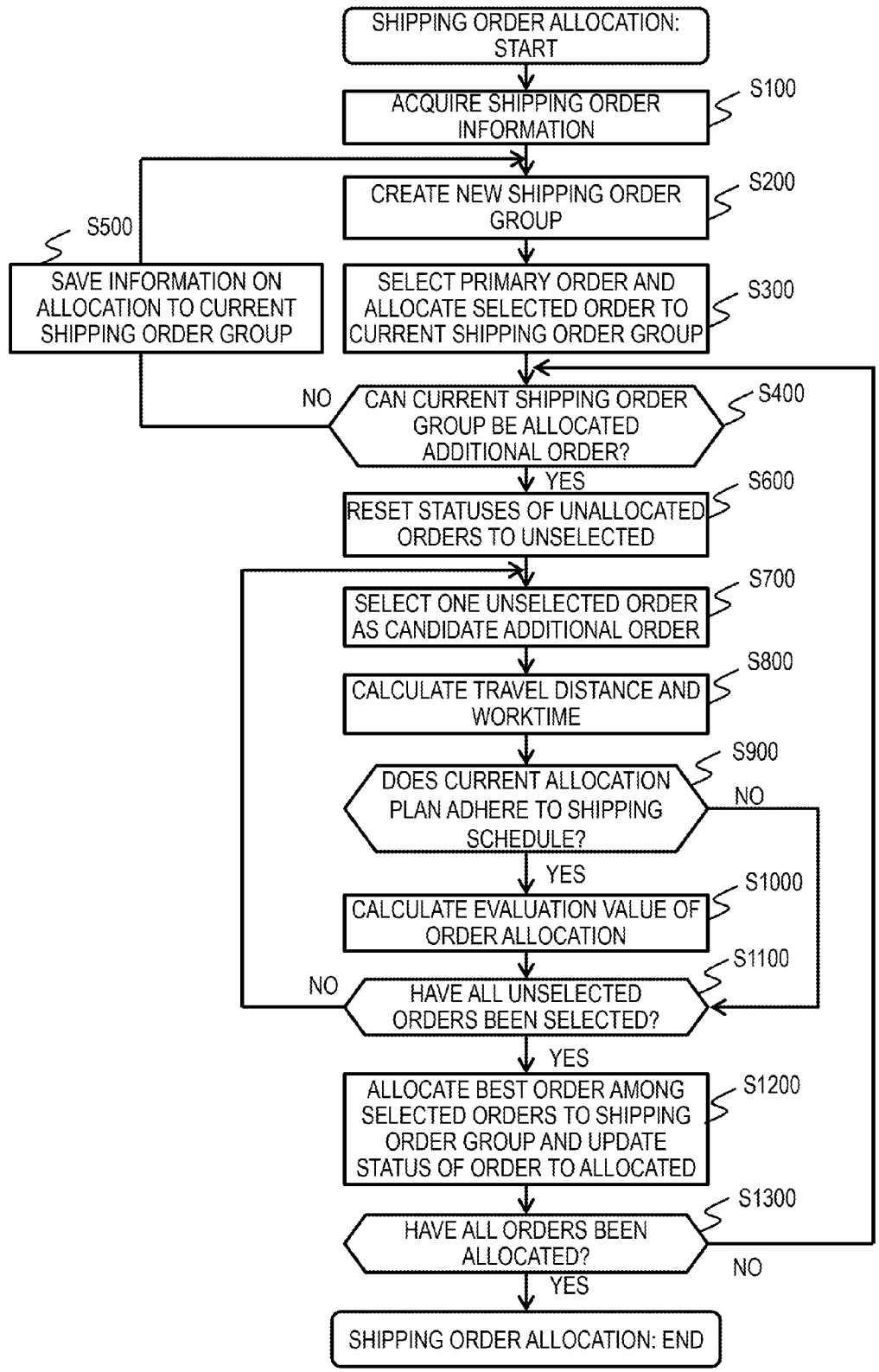
FIG. 12 is a flowchart illustrating an example of shipping order allocation processing using a stepwise addition approach.

FIG. 12 illustrates an example of shipping order allocation processing. The new shipping order allocation plan creation unit 121 acquires information on shipping orders to be used to create a shipping order allocation plan from the shipping order information table 1110 (S100).

The new shipping order allocation plan creation unit 121 creates a new shipping order group to be allocated shipping orders and determines the created order group to be the shipping order group currently being allocated (S200). At this step, the new shipping order allocation plan creation unit 121 determines the time to start picking this new shipping order group. For example, the new shipping order allocation plan creation unit 121 calculates the processing time required to complete the creating of the new shipping order group and calculates the sum of this processing time and the time required to prepare to start the picking work input by the user. The new shipping order allocation plan creation unit 121 can determine the time obtained by adding the calculated sum to the current time of day to be the picking start time. Alternatively, the new shipping order allocation plan creation unit 121 may receive input of the picking start time from the user.

The new shipping order allocation plan creation unit 121 selects a primary order to be allocated to the shipping order group currently being allocated from the shipping order information and allocates the primary order to the shipping order group (S300). Examples of methods of selecting the primary order are as follows.

(1) The new shipping order allocation plan creation unit 121 selects one of the unallocated shipping orders from the shipping order information at random and determines the selected order to be the primary order.

(2) The new shipping order allocation plan creation unit 121 selects the order including the most various kinds of articles to be picked among all unallocated orders as primary order. Specifically, the new shipping order allocation plan creation unit 121 counts the number of article IDs, using each shipping order ID in the shipping order information as a search key. The articles in an order including various kinds of articles to be picked are more likely to be spread in many blocks; accordingly, the order is more likely to require a wide picking tour in the warehouse. That is to say, there is a high possibility that the picking tour route and the vicinity thereof for this order include blocks to be visited for other orders. Accordingly, selecting such an order as primary order leads the new shipping order allocation plan creation unit 121 to achieve a shorter travel distance in total for a plurality of shipping order groups.

(3) The new shipping order allocation plan creation unit 121 calculates the number of blocks to be visited in each unallocated order and selects the order including the largest number of blocks to be visited as primary order. Specifically, the new shipping order allocation plan creation unit 121 counts the number of block IDs in the article location information table 1120, using each shipping order ID in the shipping order information as a search key. Selecting such an order as primary order increases the possibility that the blocks to be visited for the primary order include blocks to be visited for other orders; accordingly, the new shipping order allocation plan creation unit 12 achieves a shorter travel distance for the shipping order group including this primary order.

(4) The new shipping order allocation plan creation unit 121 selects the order that requires the longest travel distance among all unallocated orders and determines the selected order to be the primary order. Specifically, the new shipping order allocation plan creation unit 121 extracts an order that requires the longest travel distance with reference to the article location information table 1120, using each shipping order ID in the shipping order information as a search key. The travel distance of each order can be calculated by the method to be described later at Step S800. Selecting such an order as the primary order increases the possibility that the picking tour route and the vicinity thereof for this order include blocks to be visited for other orders; accordingly, the new shipping order allocation plan creation unit 121 achieves a shorter travel distance in total for all shipping order groups.

The new shipping order allocation plan creation unit 121 determines whether the current shipping order group can be allocated an additional order with reference to the parameter information table 1170 (S400). For example, if the shipping order group allowed to be allocated six orders at maximum is currently allocated one order, the new shipping order allocation plan creation unit 121 determines that the shipping order group can be allocated an additional order (S400: YES) and proceeds to Step S600. If the same shipping order group is currently allocated six orders, the new shipping order allocation plan creation unit 121 determines that the shipping order group cannot be allocated an additional order (S400: NO) and proceeds to Step S500.

In the case of determining that the current shipping order group cannot be allocated an additional order (S400: NO), the new shipping order allocation plan creation unit 121 stores the result of allocation to the current shipping order group to the shipping order allocation result information storage area 115 (S500) and proceeds to Step S200.

The new shipping order allocation plan creation unit 121 resets the statuses of all unallocated orders to "unselected" (S600). The new shipping order allocation plan creation unit 121 selects one of the unselected orders, determines the selected order to be a candidate additional order, and updates the status of the selected order to "selected" (S700).

The picking travel distance calculation unit 123 calculates the total travel distance for the picking group and the picking worktime calculation unit 122 calculates the total worktime for the picking group about the new allocation plan or the shipping order group obtained by allocating the candidate additional order to the current shipping order group (S800).

Examples of methods of calculating the total travel distance in picking are as follows.

(1) The picking travel distance calculation unit 123 acquires block IDs of the blocks to be visited in the new allocation plan with reference to the article location information table 1120. Defining the total number of blocks to be visited as total number of hops, the picking travel distance calculation unit 123 multiplies the total number of hops by a predetermined coefficient to determine the total travel distance for the new allocation plan.

(2) The picking travel distance calculation unit 123 acquires block IDs of the blocks to be visited in the new allocation plan with reference to the article location information table 1120. The picking travel distance calculation unit 123 acquires each travel distance between blocks to be visited from the block-to-block distance information table 1130 and calculates the shortest route to visit all blocks to be visited. The picking travel distance calculation unit 123 determines the total travel distance in this shortest route to be the total travel distance of the new allocation plan. The picking travel distance calculation unit 123 can calculate the shortest route by solving the traveling salesman problem given with the blocks to be visited in the new allocation plan and the travel distances between blocks to be visited by the nearest neighbor algorithm, for example. Alternatively, the picking travel distance calculation unit 123 may calculate the travel distances of all possible routes and select the shortest one.

Examples of methods of calculating the total picking worktime are as follows.

(1) The picking worktime calculation unit 122 acquires the picking time per piece of article and the traveling speed from the parameter information table 1170, for example. The picking worktime calculation unit 122 multiplies the picking time by the total picking quantity of the articles in the new allocation plan, multiplies the traveling speed by the total travel distance, and sums up the results to obtain the total picking worktime.

(2) The picking worktime calculation unit 122 acquires the picking quantities of the articles and the travel distances in the previous shipping order groups from the shipping history information table 1180 and conducts multivariate analysis such as principal component analysis or factor analysis to yield an estimation formula on worktime including the picking quantity of articles and the travel distance for variables. The picking worktime calculation unit 122 uses this estimation formula to calculate the total picking worktime for the new allocation plan.

The shipping schedule adherence evaluation unit 124 determines whether the work will be completed by the earliest shipping time limit with the new allocation plan (S900). In this embodiment, if the picking worktime for the shipping orders in the current new allocation plan is shorter than the permitted picking worktime, or the difference between the earliest shipping time limit and the scheduled picking start time, the shipping schedule adherence evaluation unit 124 determines that the new allocation plan adheres to the shipping schedule (S900: YES) and proceeds to Step S1000. If the permitted picking worktime is equal to or shorter than the picking worktime for this new allocation plan, the shipping schedule adherence evaluation unit 124 determines that the new allocation plan does not adhere to the shipping schedule (S900: NO) and proceeds to Step S1100.

The new shipping order allocation plan creation unit 121 calculates the evaluation value of the new allocation plan (S1000). The new shipping order allocation plan creation unit 121 calculates the evaluation value by one of the following methods, for example.

(1) The new shipping order allocation plan creation unit 121 calculates the number of storage blocks common to the storage blocks to be visited in the current shipping order group and the storage blocks to be visited in the candidate additional order with reference to the article location information table 1120, substitutes the number of common storage blocks into a predetermined increasing function, and determines the obtained value to be the evaluation value. That is to say, more common storage blocks (fewer blocks to be visited) result in a higher evaluation value.

(2) The picking travel distance calculation unit 123 calculates the total travel distance of the picking tour route for the new allocation plan, and the new shipping order allocation plan creation unit 121 substitutes the total travel distance into a predetermined decreasing function and determines the obtained value to be the evaluation value. That is to say, a shorter total travel distance results in a higher evaluation value. The picking travel distance calculation unit 123 can calculate the total travel distance by the same method as the one used to calculate a travel distance at Step S800.

The new shipping order allocation plan creation unit 121 determines whether all unallocated orders have been selected as a candidate additional order at Steps S700 to S900 and their statuses are shown as "selected" (S1100). If determining that all unallocated orders have been selected (S1100: YES), the new shipping order allocation plan creation unit 121 proceeds to Step S1200. If not determining that all unallocated orders have been selected (S1100: NO), the new shipping order allocation plan creation unit 121 proceeds to Step S700.

The new shipping order allocation plan creation unit 121 selects the candidate additional order with which the new allocation plan attains the best evaluation value (the highest value in the case of evaluation value calculated by the method (1) or (2) at Step S1000) among all the selected candidate additional orders, allocates the selected order to the current shipping order group, updates the shipping order group, and changes the status of the order to "allocated" (S1200).

If a plurality of candidate additional orders exist with which the new allocation plans attain the best evaluation value calculated by either the above-described method (1) or (2), the new shipping order allocation plan creation unit 121 may select any one of the plurality of candidate additional orders or alternatively, further calculate the evaluation values by the other method to select the order included in the new allocation plan that attains the best evaluation value calculated by the other method from the plurality of candidate additional orders.

The new shipping order allocation plan creation unit 121 may select the orders with which the new allocation plans attain evaluation values higher than a predetermined threshold or a predetermined number of orders in descending order from the order with which the new allocation plan attains the highest evaluation value from the selected candidate additional orders, and output candidate allocation plans each obtained by allocating one of the selected orders to the current shipping order group. Subsequently, the new shipping order allocation plan creation unit 121 determines the order to be allocated from the candidate allocation plans in accordance with input from the user through the communication unit 140 or the input unit 150, for example.

The new shipping order allocation plan creation unit 121 determines whether the acquired shipping order information includes unallocated order information (S1300). If the acquired shipping order information includes unallocated order information (S1300: NO), the new shipping order allocation plan creation unit 121 proceeds to Step S400 and if the acquired shipping order information does not include unallocated order information (S1300: YES), exits the shipping order allocation processing.

In the shipping order allocation, the shipping order allocation apparatus 210 yields a combination of orders that achieves a shorter picking worktime by performing the processing of Steps S100 to S1300. Further, in the allocation processing, the shipping order allocation apparatus 210 discontinues the allocation to a shipping order group so as not to fall behind the shipping schedule before the number of shipping orders in the shipping order group reaches the upper limit value and increases the number of shipping order groups, so that allocation plans that adhere to the shipping schedules can be yielded.

As described above, the shipping order allocation apparatus 210 creates an optimum shipping order allocation plan using a stepwise addition approach that adds unallocated shipping orders to a shipping order group one by one. However, the shipping order allocation apparatus 210 may use a searching approach to create the optimum shipping order allocation plan. The searching approach modifies shipping order allocation to a plurality of shipping order groups created at random or created through a stepwise addition approach by solving a combinatorial problem of the shipping orders for the shipping order groups through a mathematical optimization approach such as a generic algorithm.

Figure 13:
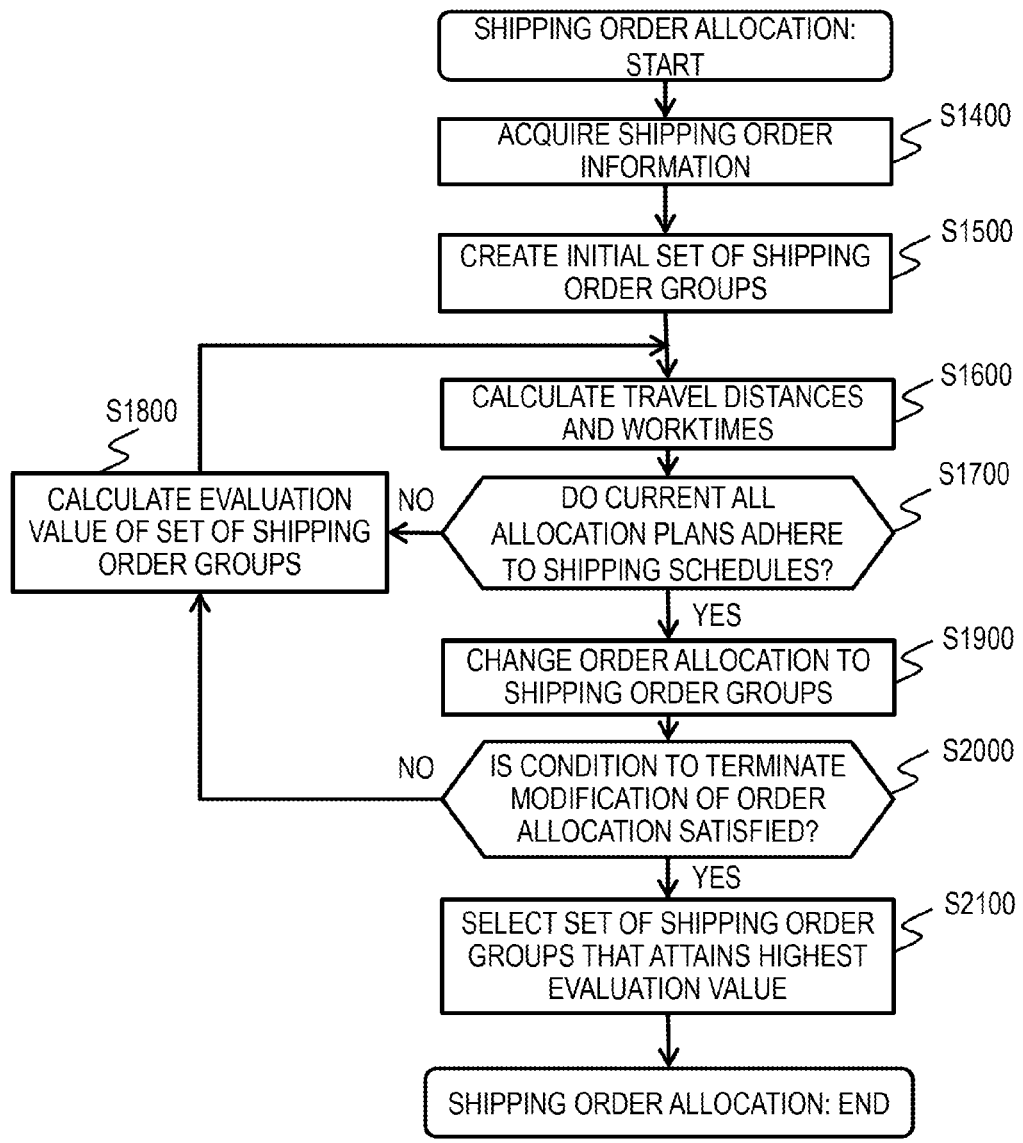
FIG. 13 is a flowchart illustrating an example of shipping order allocation processing using a searching approach.

FIG. 13 illustrates an example of shipping order allocation processing using the searching approach. The new shipping order allocation plan creation unit 121 acquires information on shipping orders to be used to create shipping order allocation plans from the shipping order information table 1110 (S1400). At this step, the new shipping order allocation plan creation unit 121 determines the picking start times for the new shipping order groups by the same method as Step S200.

The new shipping order allocation plan creation unit 121 allocates the shipping orders included in the acquired shipping order information to shipping order groups to create a set of shipping order groups composed of the shipping order groups (S1500). The new shipping order allocation plan creation unit 121 creates the set of shipping order groups so as to satisfy the constraint conditions stored in the parameter information table 1170 (in the case of taking the example of FIG. 10, each order group should be allocated six orders at maximum). Hereinafter, for the parts referring to the processing shown in FIGS. 4 to 12 (for example, the steps in FIG. 12), "shipping order" should be read as shipping order group and "shipping order group" as a set of shipping order groups.

The picking travel distance calculation unit 123 calculates the picking travel distance and the picking worktime calculation unit 122 calculates the picking worktime for each of the shipping order groups included in the set of shipping order groups, using the same method as Step S800, for example (S1600).

The shipping schedule adherence evaluation unit 124 determines whether the work on the shipping order group will be completed by the earliest shipping time limit for each of the shipping order groups included in the set of shipping order groups, using the same method as Step 900, for example (S1700). If determining that all of the shipping order groups can adhere to their shipping schedules (S1700: YES), the shipping schedule adherence evaluation unit 124 proceeds to Step S1900; if determining that at least one shipping order group cannot adhere to its shipping schedule (S1700: NO), the shipping schedule adherence evaluation unit 124 proceeds to Step S1800. The new shipping order allocation plan creation unit 121 changes the order allocation to the shipping order groups in accordance with a predetermined algorithm, for example (S1800), meaning that the new shipping order allocation plan creation unit 121 creates a different set of shipping order groups, and proceeds to Step S1600.

At Step S1800, the new shipping order allocation plan creation unit 121 may move a given shipping order in the shipping order group that cannot adhere to the shipping schedule to any other shipping order group or swap the given shipping order with a given shipping order in any other shipping order group. The new shipping order allocation plan creation unit 121 may store the order group that cannot adhere to the shipping schedule to the storage unit 110 at Step S1700 so as not to create the same shipping order group stored in the storage unit 110 again in changing the order allocation. The new shipping order allocation plan creation unit 121 may change the order allocation to the shipping order groups using a generic algorithm, for example.

Alternatively, the new shipping order allocation plan creation unit 121 may recreate a set of shipping order groups at Step S1800, like at Step S1500. The number of shipping order groups included in the recreated set of shipping order groups can be different from the number of shipping order groups included in the set of shipping order groups created at Step S1500.

The new shipping order allocation plan creation unit 121 calculates the evaluation value of the plurality of shipping order groups (S1900). The new shipping order allocation plan creation unit 121 calculates the evaluation value by one of the following methods, for example.

(1) The new shipping order allocation plan creation unit 121 calculates the number of blocks to be visited in each of the plurality of shipping order groups with reference to the article location information table 1120, substitutes the total sum of the numbers of blocks into a predetermined increasing function, and determines the obtained value to be the evaluation value.

(2) The picking travel distance calculation unit 123 calculates the travel distances of the picking tour routes of the plurality of shipping order groups, and the new shipping order allocation plan creation unit 121 substitutes the total sum of the travel distances into a predetermined decreasing function and determines the obtained value to be the evaluation value.

The new shipping order allocation plan creation unit 121 determines whether the condition to terminate modification of the order allocation to the shipping order groups is satisfied (S2000). If determining that the condition to terminate modification of the order allocation to the shipping order groups is satisfied, the new shipping order allocation plan creation unit 121 proceeds to Step S2100; if determining that the termination condition is not satisfied, the new shipping order allocation plan creation unit 121 proceeds to Step S1800. An example of the termination condition is that the order allocation to the shipping order groups has been modified for a predetermined times or more. The new shipping order allocation plan creation unit 121 determines the set of shipping order groups that attains the highest evaluation value to be a result of allocation to shipping order groups (S2100). If a plurality of sets of shipping order groups exist that attain the highest evaluation value calculated by either one of the above-described methods (1) and (2), the new shipping order allocation plan creation unit 121 may select any one of the plurality of sets of shipping order groups or alternatively, further calculate the evaluation values by the other method to select the set of shipping order group that attains the highest evaluation value calculated by the other method from the plurality of sets of shipping order groups.

The new shipping order allocation plan creation unit 121 may select the sets of shipping order groups that attain evaluation values higher than a predetermined threshold or a predetermined number of sets of shipping order groups in descending order of the evaluation value and output the selected sets of shipping order groups as allocation results. Subsequently, the new shipping order allocation plan creation unit 121 determines a set of shipping order groups from the allocation results in accordance with input from the user through the communication unit 140 or the input unit 150.

In the shipping order allocation, the shipping order allocation apparatus 210 yields combinations of orders that achieve a shorter picking worktime through the processing of Steps S1400 to S2100. Particularly, in the case where a set of shipping order groups created in the processing of Steps S100 to S1300 is used as the set of shipping order groups at S1500, the shipping order allocation apparatus 210 can yield a set of shipping order groups that achieves a picking worktime still shorter than the set of shipping order groups created at Steps S100 to S1300.

Figure 14:
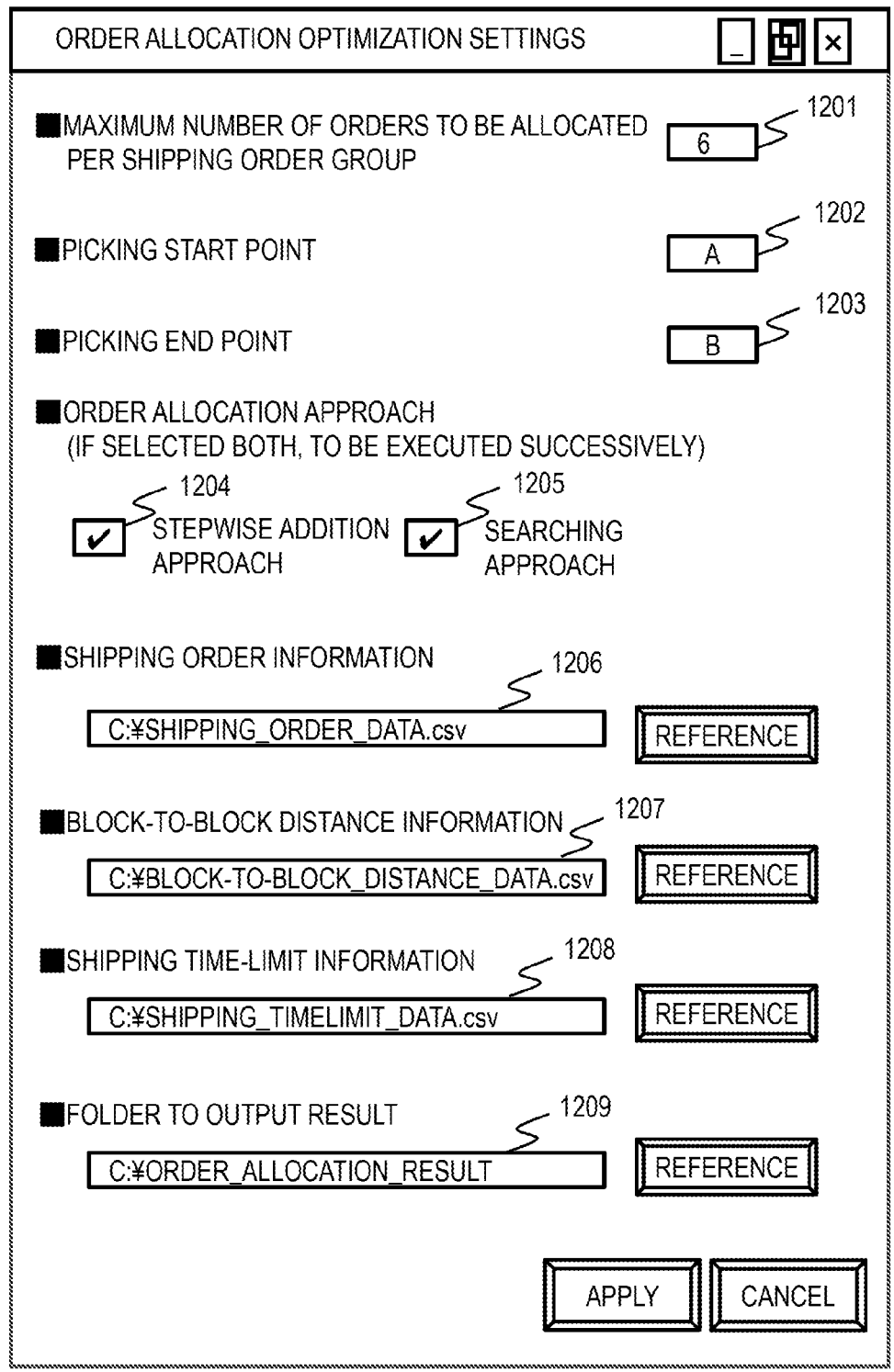
FIG. 14 shows an example of a screen for order allocation optimization settings.

FIG. 14 shows an example of a screen for order allocation optimization settings. This screen is to enter information to be stored to the storage unit 110 and display information stored in the storage unit 110. This screen includes entry fields 1201 to 1203, checkboxes 1204 and 1205, and entry fields 1206 to 1209.

The entry field 1201 accepts input of the maximum number of orders to be allocated to a shipping order group. The entry field 1202 accepts input of information on the picking start point. The entry field 1203 accepts input of information on the picking end point. The checkbox 1204 is to choose the stepwise addition approach for the shipping order allocation. The checkbox 1205 is to choose the searching approach for the shipping order allocation.

The entry field 1206 accepts input of shipping order information. The input shipping order information is stored to the shipping order information storage area 111. The entry field 1207 accepts input of block-to-block distance information. The input block-to-block distance information is stored to the block-to-block distance information storage area 113. The entry field 1208 accepts input of shipping time-limit information on shipping orders. The input shipping time-limit information is stored to the shipping time-limit information storage area 114. The entry field 1209 accepts input of the location to output the result of allocation to shipping order groups.

Figure 15:
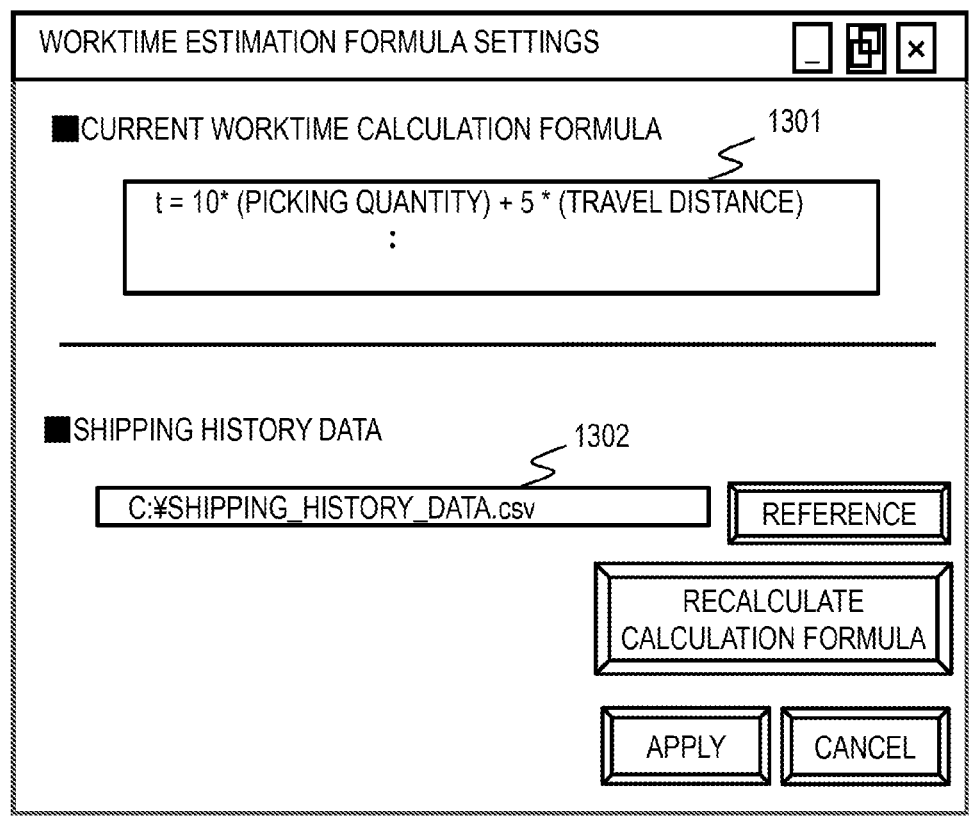
FIG. 15 shows an example of a screen for picking worktime estimation formula settings.

FIG. 15 shows an example of a screen for picking worktime estimation formula settings. This screen includes entry fields 1301 and 1302, for example. The entry field 1301 accepts input of a formula to calculate the picking worktime. The entry field 1302 accepts input of shipping history data. The input shipping history data is stored to the shipping history information storage area 118.

FIG. 16 shows an example of a screen to output a result of order allocation. This screen displays information on a result of order allocation stored in the shipping order allocation result information storage area 115 and the shipping order group worktime information storage area 116, for example. This screen includes a shipping order allocation result display field 1401 and a detailed shipping order group information display field 1402.

The shipping order allocation result display field 1401 shows information stored in the shipping order allocation result information storage area 115, or the order numbers and allocated shipping order group numbers for example, as the result of shipping order allocation. The detailed shipping order group information display field 1402 shows information stored in the shipping order group worktime information storage area 116, or the total worktimes of the shipping order groups, for example.

Although not shown in FIG. 16, the shipping order allocation result display field 1401 may further show the articles included in each shipping order, the blocks storing the articles, the picking quantities of the articles, and the picking tour route of each shipping order group. It is preferable that the picking tour route of each shipping order group be displayed together with the layout of the picking area.

This invention is not limited to the above-described embodiments but includes various modifications. The above-described embodiments are explained in details for better understanding of this invention and are not limited to those including all the configurations described above.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

What is claimed is:

1. A shipping order allocation apparatus comprising a processor and a storage device and configured to allocate shipping orders to shipping order groups,
    wherein the storage device holds:
        shipping order information indicating shipping orders and articles included in the shipping orders;
        shipping time-limit information indicating shipping time limits of the shipping orders; and
        article location information indicating blocks where articles included in the shipping orders are stored, and
    wherein the processor is configured to:
        create a shipping order group composed of shipping orders included in the shipping order information;
        acquire a time to start picking for the shipping order group;
        acquire blocks where articles included in the shipping order group are stored from the article location information and calculate a total worktime for the picking of the shipping order group based on the acquired blocks;
        determine whether the picking work for the shipping order group is completed by the earliest shipping time limit among shipping time limits of the shipping orders in the shipping order group based on the shipping time-limit information, the time to start the picking, and the total worktime for the picking;
        calculate an evaluation value of the shipping order group for which the picking work is determined to be completed by the earliest shipping time limit among the shipping time limits of the shipping orders in the shipping order group, based on the blocks storing the articles included in the shipping order group; and
        determine whether to include the shipping order group in a result of allocation to shipping order groups, based on the evaluation value.

2. The shipping order allocation apparatus according to claim 1,
    wherein the storage device further holds:
        block-to-block distance information including information on distances between a picking start point and an article storage blocks, a distances between article storage blocks, and distances between a picking end point and article storage blocks; and
        parameter information including a traveling speed and a picking time per piece of an article,
    wherein the shipping order information includes information indicating quantities of the articles included in the shipping orders, and
    wherein the processor is configured to:
        calculate a total travel distance to pick all articles included in the shipping order group based on the shipping order information, the article location information, and the block-to-block distance information; and calculate a total worktime for entire picking work inclusive of traveling in picking the shipping order group based on the total travel distance, the traveling speed, the quantities of the articles included in the shipping orders in the shipping order group acquired from the shipping order information, and the picking time per piece of an article.

3. The shipping order allocation apparatus according to claim 1, wherein the storage device further holds information on distances between article storage blocks including information on distances between a picking start point and article storage blocks, distances between article storage blocks, and distances between a picking end point and the article storage blocks, and wherein the processor is configured to:

calculate a total travel distance to pick all articles included in the shipping order group based on the shipping order information, the article location information, and the information on distances between article storage blocks; and calculate the evaluation value based on the total travel distance.

4. A method for allocating shipping orders to shipping order groups by a shipping order allocation apparatus, wherein the shipping order allocation apparatus holds:

shipping order information indicating shipping orders and articles included in the shipping orders;

shipping time-limit information indicating shipping time limits of the shipping orders; and article location information indicating blocks where articles included in the shipping orders are stored, and wherein the method comprising:

creating, by the shipping order allocation apparatus, a shipping order group composed of shipping orders included in the shipping order information;

acquiring, by the shipping order allocation apparatus, a time to start picking for the shipping order group;

acquiring, by the shipping order allocation apparatus, blocks where articles included in the shipping order group are stored from the article location information and calculating, by the shipping order allocation apparatus, a total worktime for the picking of the shipping order group based on the acquired blocks;

determining, by the shipping order allocation apparatus, whether the picking work for the shipping order group is completed by the earliest shipping time limit among shipping time limits of the shipping orders in the shipping order group based on the shipping time-limit information, the time to start the picking, and the total worktime for the picking;

calculating, by the shipping order allocation apparatus, an evaluation value of the shipping order group for which the picking work is determined to be completed by the earliest shipping time limit among the shipping time limits of the shipping orders in the shipping order group, based on the blocks storing the articles included in the shipping order group; and determining, by the shipping order allocation apparatus, whether to include the shipping order group in a result of allocation to shipping order groups, based on the evaluation value.

5. The method according to claim 4, wherein the shipping order allocation apparatus further holds:

block-to-block distance information including information on distances between a picking start point and an article storage blocks, a distances between article storage blocks, and distances between a picking end point and article storage blocks; and parameter information including a traveling speed and a picking time per piece of an article, wherein the shipping order information includes information indicating quantities of the articles included in the shipping orders, and wherein the method further comprising:

calculating, by the shipping order allocation apparatus, a total travel distance to pick all articles included in the shipping order group based on the shipping order information, the article location information, and the block-to-block distance information; and calculating, by the shipping order allocation apparatus, a total worktime for entire picking work inclusive of traveling in picking the shipping order group based on the total travel distance, the traveling speed, the quantities of the articles included in the shipping orders in the shipping order group acquired from the shipping order information, and the picking time per piece of an article.

6. The method according to claim 4, wherein the shipping order allocation apparatus further holds information on distances between article storage blocks including information on distances between a picking start point and article storage blocks, distances between article storage blocks, and distances between a picking end point and the article storage blocks, and wherein the method further comprising:

calculating, by the shipping order allocation apparatus, a total travel distance to pick all articles included in the shipping order group based on the shipping order information, the article location information, and the information on distances between article storage blocks; and calculating, by the shipping order allocation apparatus, the evaluation value based on the total travel distance.

* * * * *